(12) United States Patent
Baeumer et al.

(10) Patent No.: US 8,723,132 B2
(45) Date of Patent: May 13, 2014

(54) SINGLE PHOTON RADIATION DETECTOR

(75) Inventors: Christian Baeumer, Hergenrath (BE);
Thomas Frach, Aachen (DE);
Christoph Herrmann, Aachen (DE);
Gordian Prescher, Cologne (DE);
Torsten Solf, Aachen (DE); Roger Steadman Booker, Aachen (DE);
Guenter Zeitler, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 356 days.

(21) Appl. No.: 12/933,147

(22) PCT Filed: Mar. 12, 2009

(86) PCT No.: PCT/IB2009/051034
§ 371 (c)(1),
(2), (4) Date: Sep. 17, 2010

(87) PCT Pub. No.: WO2009/115956
PCT Pub. Date: Sep. 24, 2009

(65) Prior Publication Data
US 2011/0017918 A1 Jan. 27, 2011

(30) Foreign Application Priority Data
Mar. 19, 2008 (EP) .................................. 08152968

(51) Int. Cl.
*G01T 1/208* (2006.01)
(52) U.S. Cl.
USPC ...................................................... 250/370.11
(58) Field of Classification Search
CPC .............................. G01T 1/1645; G01T 1/208
USPC .................................................. 250/370.11
See application file for complete search history.

(56) References Cited

U.S. PATENT DOCUMENTS

| | | | | |
|---|---|---|---|---|
| 4,298,947 A | * | 11/1981 | Tamura et al. | 702/130 |
| 6,525,323 B1 | * | 2/2003 | Vesel et al. | 250/369 |
| 7,917,192 B2 | | 3/2011 | Dos Santos Varela | |
| 2005/0012033 A1 | | 1/2005 | Stern et al. | |
| 2008/0240341 A1 | * | 10/2008 | Possin et al. | 378/19 |
| 2008/0308738 A1 | * | 12/2008 | Li et al. | 250/370.11 |
| 2009/0008561 A1 | * | 1/2009 | Nagarkar et al. | 250/361 R |

FOREIGN PATENT DOCUMENTS

| | | |
|---|---|---|
| EP | 1148348 A2 | 10/2001 |
| WO | 2005069040 A1 | 7/2005 |
| WO | 2006034585 A1 | 4/2006 |
| WO | 2006111869 A2 | 10/2006 |
| WO | 2006111883 A2 | 10/2006 |
| WO | 2006126026 A1 | 11/2006 |
| WO | WO 2008021663 A2 * | 2/2008 |

OTHER PUBLICATIONS

Surti et al: "A Count-Rate Model for Pet Scanners Using Pixelated Anger-Logic Detectors With Different Scintillators"; Physics in Medicine and Biology, vol. 50, No. 23, pp. 5697-5715.

* cited by examiner

*Primary Examiner* — Constantine Hannaher

(57) ABSTRACT

The invention relates to a radiation detector that is particularly suited for energy resolved single X-ray photon detection in a CT scanner. In a preferred embodiment, the detector has an array of scintillator elements in which incident X-ray photons are converted into bursts of optical photons. Pixels associated to the scintillator elements determine the numbers of optical photons they receive within predetermined acquisition intervals. These numbers can then be digitally processed to detect single X-ray photons and to determine their energy. The pixels may particularly be realized by avalanche photodiodes with associated digital electronic circuits for data processing.

17 Claims, 5 Drawing Sheets

_US 8,723,132 B2_

SINGLE PHOTON RADIATION DETECTOR

FIELD OF THE INVENTION

The invention relates to a method and a radiation detector for detecting single (e.g. X-ray) photons. Moreover, it relates to an imaging system comprising such a detector and to a computer program product for executing such a method.

BACKGROUND OF THE INVENTION

WO 2006/34585 A1 discloses a radiation detector comprising a scintillator for converting incident X-ray photons into bursts of optical photons and a semiconductor photomultiplier for converting the burst of optical photons into an electrical pulse. The generated electrical pulses are counted and discriminated with respect to their peak-height in order to determine the rate and energy of the incident X-ray photons.

BRIEF DESCRIPTION OF THE INVENTION

Based on this situation it was an object of the present invention to provide alternative means for detecting single photons, particularly gamma or X-ray photons, wherein it is desirable that photons with high rates can be detected and/or that their energy can be resolved.

This object is achieved by a radiation detector according to claim 1, an imaging system according to claim 12, a method according to claim 13, and a computer program product according to claim 15. Preferred embodiments are disclosed in the dependent claims.

The radiation detector according to the present invention serves for the detection of electromagnetic radiation, particularly of gamma photons and/or of X-ray photons in an energy range between about 10 keV and about 200 keV.

The detector comprises the following components:
a) At least one scintillator element for converting an incident photon (if it interacts with the scintillator material) into a burst of optical photons. Typically, a burst or shower of several hundreds to thousands of optical photons with wavelengths between about 0.2 µm and about 1.0 µm is generated by a single X-ray photon, wherein the number of the optical photons depends on the energy of the converted X-ray photon.
b) At least one "pixel" for determining the numbers of optical photons received from the aforementioned scintillator element during at least two predetermined acquisition time intervals within the duration of one burst of optical photons. The "duration of one burst" is defined in this context as the (average) time until the photon flux of the burst decays to less than 10% of its (initial) peak value. Typical values of this time range between 10 ns and 1000 ns, preferably between 45 ns and 115 ns, most preferably between 45 ns and 80 ns. Preferably, each burst is sampled by the pixel in a multitude of e.g. ten to fifty acquisition time intervals. The pixel will comprise digital circuitry as it determines and outputs not analog values but numbers.

The described radiation detector has the advantage to use digital data processing at the earliest stage of the detection process, i.e. for counting optical photons generated by e.g. X-ray photons. Thus problems associated with the processing of analog electrical signals can be avoided. By sampling a burst of optical photons in a plurality of acquisition intervals, the shape of the burst can be resolved in time, thus yielding valuable information about the associated processes. Moreover, the detector provides a high flexibility because the evaluation of its raw data, i.e. the determined digital numbers of optical photons, can largely be controlled by software.

Though the radiation detector may have just one single scintillator element and/or just one single pixel, it will typically comprise a plurality of scintillator elements and pixels arranged in a one- or two-dimensional array. Thus a spatially resolving detector can be designed as it is for example required in Computed Tomography (CT) applications.

A variety of materials that convert higher-energy photons into optical photons can be used to realize the scintillator element. The burst of optical photons that is generated by e.g. a single X-ray photon usually starts with a high peak and then decays exponentially with a characteristic decay time (i.e. the flux of the burst reduces to $1/e=37\%$ in the decay time). In this context, it is preferred that the scintillator element comprises a material with a decay time of the generated bursts of optical photons that is less than 100 nanoseconds, preferably less than 50 nanoseconds. In this case it will be possible to separate consecutive X-ray photons even at high rates of incidence. It should be noted that short decay times require short and/or closely following acquisition intervals, i.e. a fast pixel operation.

The radiation detector may optionally comprise an input for a digital clock signal, wherein the logical level (e.g. "0" or "1") of this signal determines if an acquisition interval is executed by the pixel or not. The circuits generating the clock signal will usually be a part of the radiation detector, too, though the clock signal may alternatively also be provided by exterior components. With the clock signal, the operation of the radiation detector can efficiently be controlled; thus it is for example possible to adjust the sensitivity of the pixel simply via the relative length (duty cycle) of the acquisition intervals. The clock signal will typically have a frequency in a range of tens to hundreds of Megahertz to allow for a sufficiently high temporal resolution of bursts of optical photons.

In the aforementioned embodiment, the assignment of an acquisition interval to the logical level of the digital clock signal is arbitrary. It is therefore possible that the radiation detector comprises two groups of pixels that execute an acquisition interval during different logical levels of the clock signal. If the radiation detector comprises for example a two-dimensional array of pixels, each second column of these elements may execute an acquisition interval during the logical level "1" of the clock signal, while the residual columns execute the acquisition interval during the logical level "0". In this way it is possible to distribute the access to resources (e.g. power supply or data processing capacities) more evenly.

The radiation detector may optionally further comprise an evaluation unit for evaluating the numbers determined by the pixel with respect to at least one of the following aspects:
  The detection of single converted photons. The count-numbers will for example resolve a burst of optical photons as a characteristic sequence of numbers in the temporal range, from which the underlying converted photon can be detected.
  The correction for a piling up of optical photons generated by different converted photons. This approach takes into account that, particularly at high photon fluxes, two subsequent photons may arrive in the same scintillator element so shortly in succession that their bursts of optical photons will overlap.
  The integral number of optical photons determined during a given time interval (much longer than the acquisition interval). This integral value allows to estimate the intensity of e.g. an incident X-ray beam and thus provides valuable information, particularly in case of high X-ray fluxes for which the resolution of single X-ray photons is no longer possible.

The energy of single converted photons. This information is particularly needed if the detector shall be applied in spectral CT. It can be derived from the (e.g. total or peak) number of optical photons in a detected burst of photons.

The evaluation unit may particularly be realized by digital data processing hardware with associated software. As the pixels already provide (digital) numbers as signals, it is possible to locate at least parts of the evaluation unit close to or within the pixels, thus avoiding signal losses and disturbances as well as time delays on long signal lines.

In a particular embodiment of the evaluation unit, this may comprise a timer for determining the temporal distance between two subsequent converted photons and a correction module for separating the measured effects of these two photons based on said temporal distance. The beginning of a burst of optical photons generated by a single e.g. X-ray photon can usually be detected in a simple way via the associated peak in the number of optical photons; the temporal distance between two subsequent X-ray photons can thus readily be measured, too. An algorithm for separating the overlap in the effects of the two X-ray photons can then for example use a data base (e.g. a lookup-table) in which characteristic parameters of the detection hardware (scintillator elements, pixels) are stored in an appropriate form.

According to a preferred embodiment of the invention, the pixel comprises a (one- or two-dimensional) array of detector cells each of which generates an electrical signal upon detection of a single optical photon. The electrical signal may be a digital signal having only two logical levels representing the information "Optical photon detected" or "No optical photon detected". Alternatively, the electrical signal may be an analog value, which will usually be converted into a (binary) digital value during further processing.

The aforementioned detector cells may optionally be designed such that they change from a sensitive state to an insensitive state upon detection of a single optical photon. Thus it is guaranteed that a clear, detectable state transition indicates the incidence of an optical photon.

In the aforementioned case, the detector cells are preferably reset to the sensitive state (if they are in the insensitive state) during a reset interval that lies between subsequent acquisition intervals. The digital clock signal can in this case determine the alternating sequence of acquisition and reset intervals in the detector cells.

A particular embodiment of a detector cell is an avalanche photodiode operated in Geiger mode, wherein the sensitive state is a state in a breakdown region while the insensitive state is assumed after breakdown.

To evaluate the electrical signals provided by the detector cells, the pixel preferably comprises a concentrator for summing up the electrical signals from all its detector cells provided during one acquisition interval. The output of the concentrator is then the required number of optical photons received during that period.

The invention further relates to an imaging system, particularly a CT (Computed Tomography), PET (Positron Emission Tomography), SPECT (Single Photon Emission Computed Tomography) or nuclear imaging system, comprising a radiation detector of the kind described above and optionally an X-ray source for generating X-rays.

Moreover, the invention relates to a method for detecting photons, particularly X-ray or gamma photons, the method comprising the following steps:

a) Converting photons incident on a scintillator element into a burst of optical photons.

b) Determining the numbers of optical photons received from the scintillator element during at least two predetermined acquisition intervals within the duration of one burst of optical photons.

The method comprises in general form the steps that can be executed with a radiation detector of the kind described above. Therefore, reference is made to the preceding description for more information on the details, advantages and improvements of that method.

According to a preferred embodiment of the method, the determined numbers of optical photons are evaluated with respect to the number and/or the energy of the converted photons that generated the optical photons. Such a method can particularly be executed in a CT scanner.

The radiation detector and/or the imaging system will typically be programmable, e.g. it may include a microprocessor or an FPGA. Accordingly, the present invention further includes a computer program product which provides the functionality of any of the methods according to the present invention when executed on a computing device.

Further, the present invention includes a data carrier, for example a floppy disk, a hard disk, or a compact disc (CD-ROM), which stores the computer product in a machine readable form and which executes at least one of the methods of the invention when the program stored on the data carrier is executed on a computing device.

Nowadays, such software is often offered on the Internet or a company Intranet for download, hence the present invention also includes transmitting the computer product according to the present invention over a local or wide area network. The computing device may include a personal computer or a work station. The computing device may include one of a microprocessor and an FPGA.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers or numbers differing by integer multiples of 100 refer in the Figs. to identical or similar components.

DESCRIPTION OF EMBODIMENTS

Spectral Computed Tomography has a high potential to revolutionize 3D X-ray imaging. Energy-dispersive X-ray detection in single-quantum counting mode is a main component to realize a Spectral CT scanner. Commercially available spectral X-ray imagers which feature a segmented high-Z semiconductor (e.g. CdTe, CdZnTe, GaAs) as directconversion sensor bump-bonded to a counting electronics ASIC suffer however from polarization when exposed to the high X-ray intensities which are typical of CT.

A promising photon detection and signal processing is provided by digital "Silicon Photomultipliers" (SiPMs). Similar to their analog counterparts, digital SiPMs are pixelated sensors where each pixel is a highly segmented array of single avalanche photodiode cells operating in Geiger mode. As production of digital SiPMs bases on a CMOS process, digital SiPMs provide additional functionality such as active quenching and recharge, and digital signal processing at sensor level. Most important, digital SiPMs allow for a fast sampling (up to 100 MHz) of the incident rate of converted photons. When combined with a fast scintillator, e.g. LYSO, single X-ray photon detection with energy discrimination becomes possible.

A detection system is therefore proposed here that comprises a fast scintillator connected to a digital sampling SiPM which is driven by a fast clock (frequency $f_s$). The system has a digital output which provides digitized sensor data for further processing.

Figure 1:
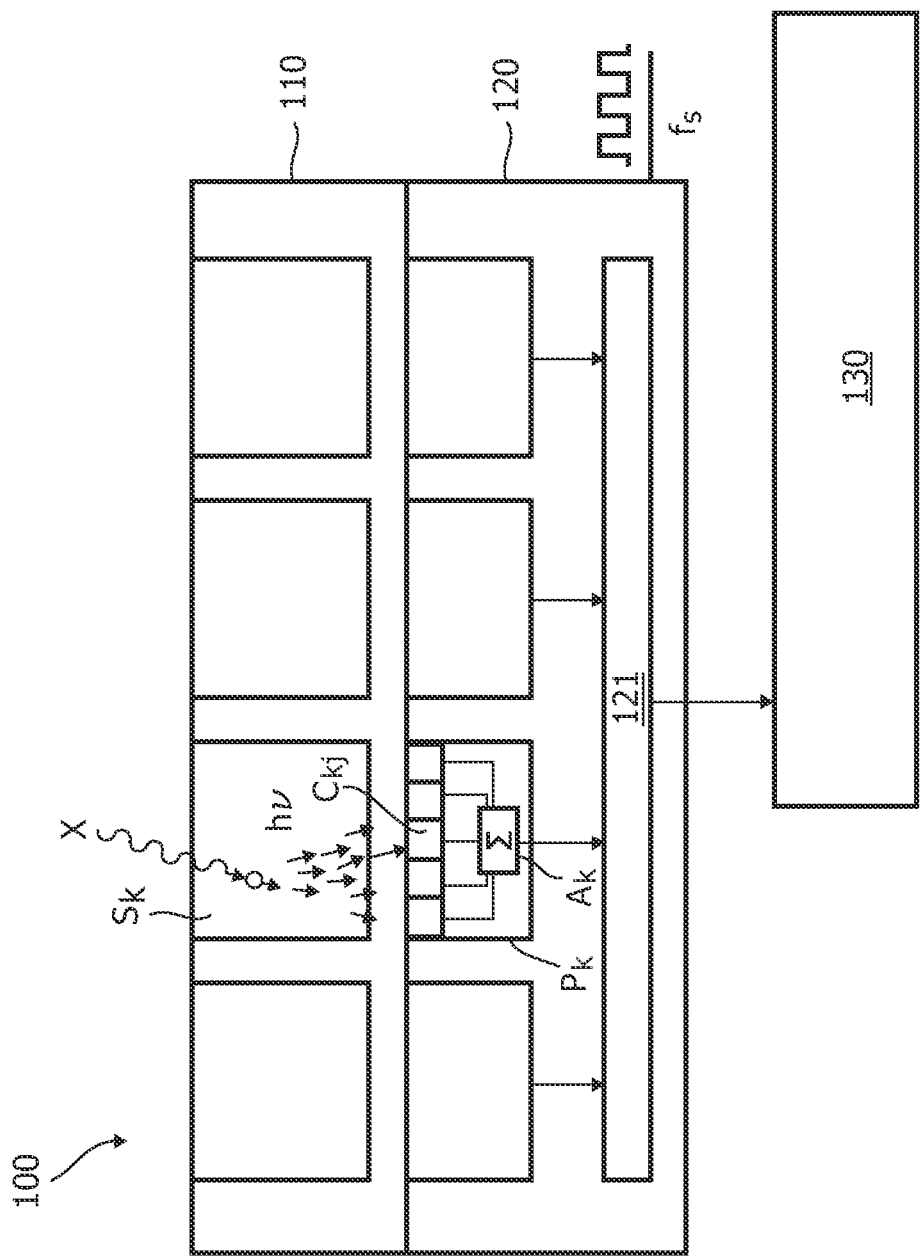
FIG. 1 schematically shows an X-ray detector according to the present invention.

FIG. 1 shows schematically an X-ray detector 100 that realizes the aforementioned principles. The X-ray detector 100 comprises a scintillation layer 110 with a (one- or two-dimensional) array of scintillator elements $S_k$ (k=1, 2, ... N, e.g. N=1000). If an X-ray photon X interacts with a scintillator element $S_k$, it is converted into a burst of optical photons hv. In an exemplary detector design, 1 mm thick LYSO may be used as scintillator material. Its response function to an incident X-ray photon is a step function with trailing edge that goes exponentially down to zero with decay time constant of 40 ns. The lateral dimension of the scintillator elements $S_k$ could be 900 μm×900 μm. The LYSO is preferably wrapped in a reflective coating from all sides except for the bottom one.

The X-ray detector 100 further comprises a digital Silicon Photomultiplier 120 (SiPM) disposed below (with respect to the direction of incidence of the X-rays) the scintillator layer 110. An additional light guide, e.g. optical glue, can be used as interposer between scintillator layer and digital SiPM. The SiPM 120 comprises an array of pixels $P_k$. As indicated in the FIG., these pixels $P_k$ are associated in a one-to-one manner to corresponding scintillator elements $S_k$, though this needs not necessarily be the case. As shown for one pixel $P_k$ only, each pixel comprises a plurality of (e.g. 30×30) "detector cells" $C_{kj}$ (j=1, 2, ... ) for the detection of single optical photons hv. Each detector cell $C_{kj}$ has for instance an area of 30 μm×30 μm which is subdivided into a photon-sensitive part and a block equipped with active electronic circuitry.

The detection signals of the all detector cells $C_{kj}$ of each pixel $P_k$ are communicated to a concentrator network $A_k$, where the total numbers of detected optical photons hv during acquisition intervals $T_1$ are determined as a digital value.

The determined numbers of all concentrators $A_k$ are communicated to some evaluation module 121 in the SiPM 120 for further digital processing and evaluation. The (digital) output of this module 121 is communicated to some higher level data processing unit 130, e.g. an external microcomputer.

Figure 2:
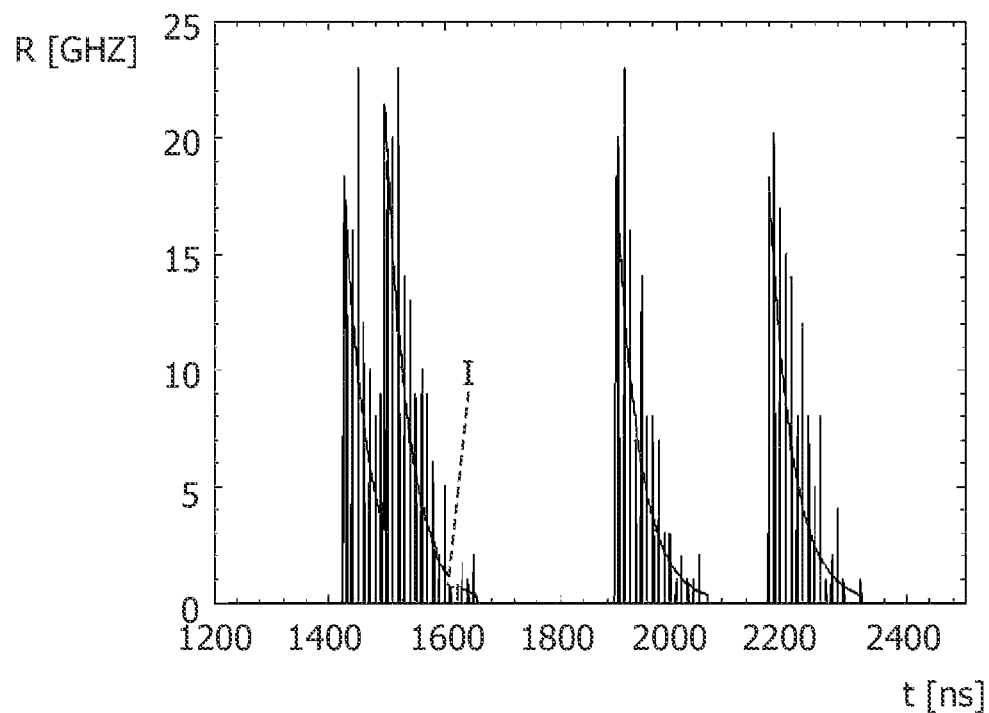
FIG. 2 shows an exemplary output of the X-ray detector.

FIG. 2 shows an exemplary simulation of the operation of the X-ray detector 100 (or a similar device) in the time domain (vertical axis: optical photon rate R as counted by one pixel $P_k$; horizontal axis: time t). The continuous solid lines I indicate the ideal light output of a scintillator. The vertical bars indicate the sampling of the optical photons with a digital SiPM. The FIG. shows that each burst of optical photons is sampled a multitude of times. Moreover, the sampled values of the scintillator light pulses deviate from the ideal ones, because the counting of the converted photons is ruled by Poisson statistics. It is a main objective of the subsequent digital processing to maximize the signal-to-noise ratio, and, thus the energy resolution.

Figure 3:
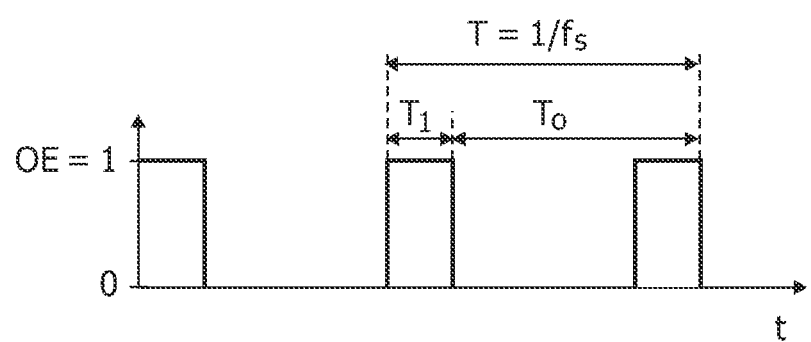
FIG. 3 illustrates a typical clock signal.

Returning to FIG. 1, it can be seen that the SiPM 120 further comprises an input for a digital clock signal with frequency $f_s$ that determines when an acquisition interval $T_1$ is executed. The clock signal is operating at a typical frequency $f_s$ of 200 MHz. In synchronous operation one clock cycle (acquisition interval $T_1$, cf. FIG. 3) is used for sensing of optical photons and the next cycle for readout and re-charge of the detection cells $C_{kj}$. Thus, all cells $C_{kj}$ are sampled with a rate of 100 MHz and read out at once.

The temporal sampling of a photon pulse leaving the scintillator requires a very fast sensor sensitive to single photons. The concept of a Digital Silicon Photomultiplier (DSiPM) as it is described in the WO 2006/111883 A2 (which is incorporated into the present text by reference) would not be appropriate to achieve this goal, as the DSiPM is not capable of temporal sampling and thus would suffer from pile-up effects in a high-flux scenario. Also, there is no need to determine the global time point of a detection event in Spectral CT or for a cell-disabling mechanism. A new sensor will therefore be described in the following which will be referred to as the "Digital Sampling Silicon Photomultiplier" (DSSiPM). The DSSiPM is built upon an array of Geiger-mode Avalanche Photodiodes cells each connected to digital circuitry. This implies that these devices either are integrated with a CMOS process or are otherwise attached to a CMOS chip containing the logic part (e.g. by chip-chip bonding).

Figure 4:
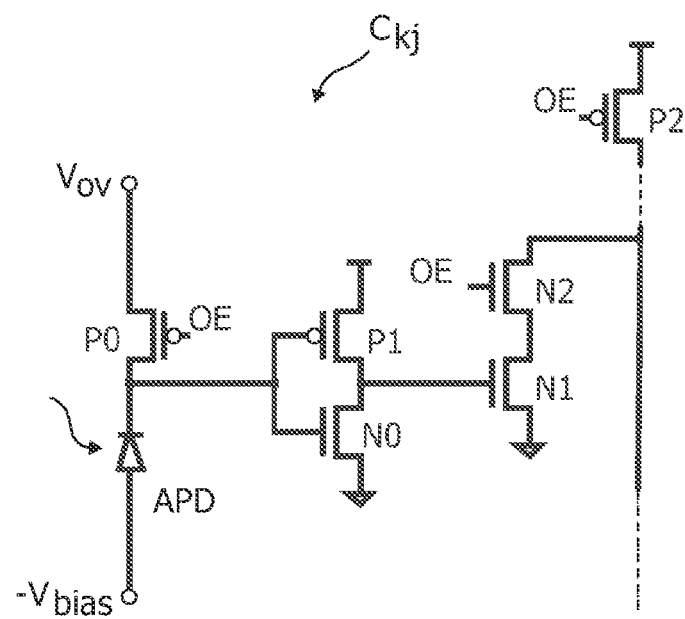
FIG. 4 shows a first embodiment of a detector cell for the X-ray detector comprising a digitizing inverter.

FIG. 4 shows schematically a possible realization of a basic DSSiPM detector cell $C_{kj}$, where the PMOS switch P2 connects the output line to the supply voltage; in the simplest implementation all cells of the same column are connected to this output line, which further connects to a latch for storing a state change of the DSSiPM cell, the row of which has been selected.

The anode of the avalanche photodiode APD is biased approximately at the breakdown voltage while the cathode can be biased at the over-voltage $V_{ov}$ through the transistor P0, when the digital clock signal OE ("Output Enable") is at logic 0. P0 is switched off for OE=1, but the diode will keep the biasing conditions for some time as long as the diode leakage is low enough. During this time, the diode is sensitive to single optical photons and the cathode will make a swing from $V_{ov}$ to approximately GND upon detection. The inverter (N0, P1) will sense the change and its output will change state from 0 to 1. As OE=1, the cascade N1, N2 (or a transmission gate) will pass the inverter output and discharge the output line, and the corresponding level change is registered in the connected latch (not shown). The output line is recharged again when OE goes to logic 0.

There are several aspects visible already at the level of the described detector cell $C_{kj}$:

1. The cell is "clocked" by OE. That means that for OE=1, the cell can detect optical photons and the detection is immediately passed to the output; for OE=0, the cell and the output line are recharged in preparation for the next photon detection. Any photon entering the diode during OE=0 may or may not be detected, but the result is passed to the output during the next acquisition phase.

2. The duty cycle (acquisition time $T_1$ to reset time $T_0$) can be varied by the duty cycle of OE, cf. illustration of the clock signal in FIG. 3. If the (optical) photon flux is low, the acquisition time $T_1$ can be many times the reset time $T_0$. Conversely, the sensitivity of the diode APD can be artificially lowered by making the acquisition time $T_1$ smaller than the reset time $T_0$. Both the OE duty cycle ($T_1:T_0$) and frequency $f_s$ can be dynamically adapted to the detected flux.

3. Typically, $V_{ov}$ determines the sensitivity of the diode and the diode must be recharged to $V_{ov}$ fully to reach the maximum sensitivity. However, the recharge time needed to reach the full level can be quite long (5-10 ns), depending on the design of P0 and the capacitance and series resistances of the diode. Making the reset phase shorter will leave the diode only partially charged and, consequently, at a lower sensitivity. So, the sensitivity of the sensor can also be reduced by reducing the duration of the reset phase $T_0$. Compared with 2), this has the distinct advantage that for a constant duty cycle, lowering the diode overvoltage will result in a lower dark count rate and thus in a higher signal to noise ratio. (The same effect can be achieved by lowering $V_{ov}$, however this can be done only to a level acceptable by the logic.) It should be noted that this can be realized only to a certain level by the circuit above as the inverter digitizes the diode level and thus sets a threshold on the voltage. Partial charging of the diode can however be used with the two circuits that will be described in the following.

Figure 5:
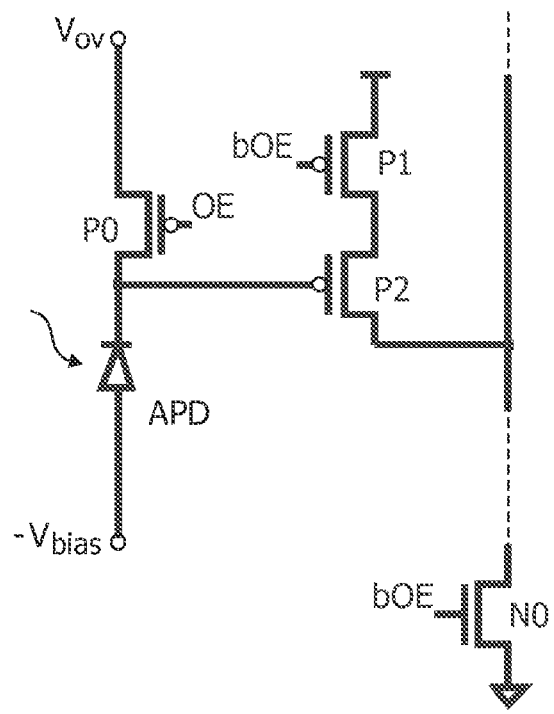
FIGS. 5 and 6 show two embodiments of a detector cell without a digitizing inverter.
Figure 6:
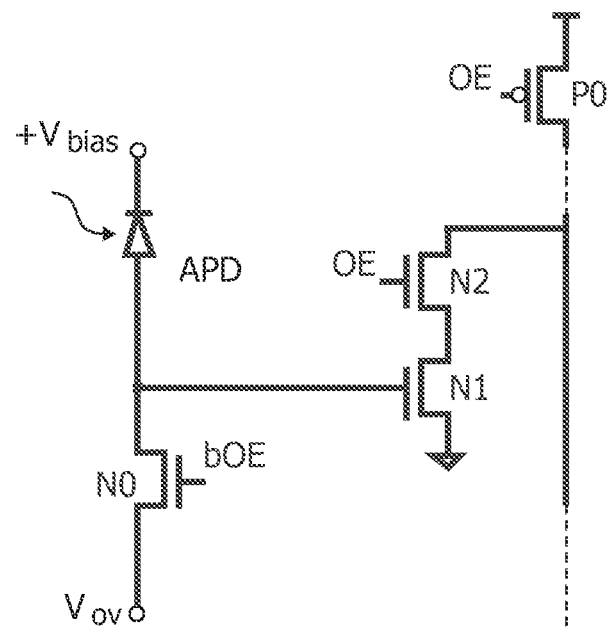

FIGS. 5 and 6 show two alternative circuits with simplified versions of the cell logic, both omitting the digitizing inverter. Instead the logic stage following the cell will act as a digitizer of the signal. The main advantage is the compactness of the logic block, thus reducing the dead area of the pixel. As the signal is not inverted anymore, the output enable (OE) transistors have turned to PMOS in FIG. 5. Also the line is inverted and is charged up to logic 1 if an optical photon has been detected. N0 is used to discharge the line back to logic 0 during the reset phase.

The circuit in FIG. 6 is complementary to the circuit of FIG. 5. The advantage here is that the diode capacitance is smaller because the diode is sensed on the anode. Also using NMOS transistors will result in a more compact circuit. The reverse bias voltage of several tens Volt is now applied to the cathode of the diode.

Figure 7:
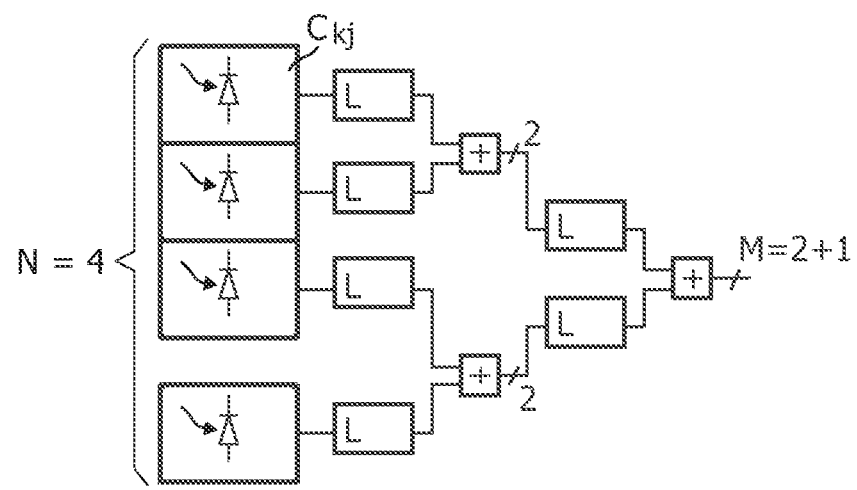
FIGS. 7 and 8 show two embodiments of a concentrator circuit for adding the outputs of single detector cells.
Figure 8:
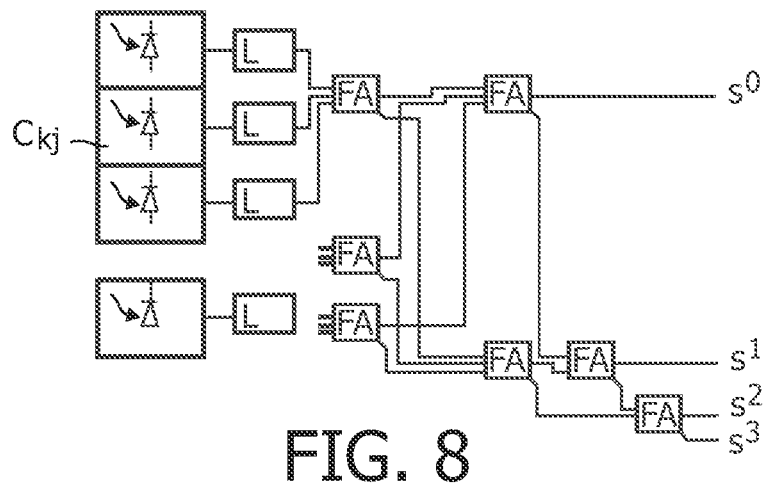

FIG. 7 illustrates a first embodiment of a more sophisticated readout scheme, in which the detector cells $C_{kj}$ do not use a common output line. Instead, the data acquired by the cells are passed to the input of a pipelined concentrator circuit. Basically, the task of the concentrator is to concentrate the N binary outputs of the cells $C_{kj}$ into a M-bit number of detected photons (with N=4 and M=3 in FIG. 7). There are several possibilities to realize the concentrator. FIG. 7 schematically shows a first embodiment comprising a conventional adder tree with latches L. FIG. 8 schematically shows a network employing latches L and full adder (FA) circuits to efficiently compress the input.

Figure 9:
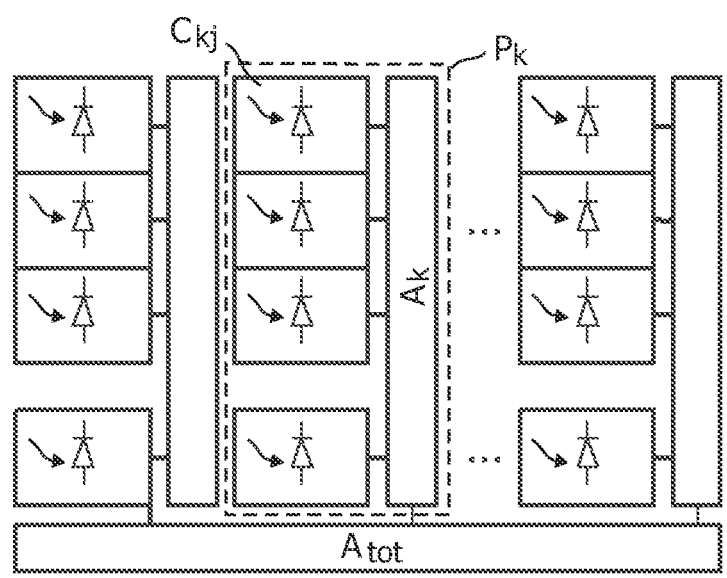
FIG. 9 shows the arrangement of concentrator networks in an X-ray device according to the present invention.

As FIG. 9 shows, the concentrator network can be placed either in between the pixel columns ($A_k$) or between the pixels ($A_{tot}$) or both.

The sensor can be reset all-at-once (which may lead to problems with the power supply stability due to the large current surge if many diodes are recharged at once) or interleaved. In the interleaved mode, adjacent columns are clocked with inverted OE (bOE), that means while one column acquires data, the other one is recharged. This scheme will double the number of sampling points but also half the sensitivity of the sensor, as the duty cycle must be exactly 50% for this scheme to work. If implemented, it will help alleviate the power supply surge problems on the $V_{ov}$ network.

A further implementation mode features conditional operation of the cells. Cells which have detected optical photon(s) are identified by digital logic circuitry and are subsequently reset. This mode can either be synchronous to the aforementioned clock or running in asynchronous mode, i.e. cells are only reset after registration of an optical photon.

As the concentrator network has to run at the full clock speed, the concentrator needs to be pipelined in order to handle the data rate. The output of the concentrator is a stream of numbers indicative of the photons detected during that time period. This stream can be analyzed in a suitable way to detect pulses corresponding to X-ray hits and/or to detect and correct the pile-up at high X-ray flux rates. If the incident X-ray photon flux exceeds a certain level, the pile-up correction will cease to work and only the integral number of photons can be returned to the data processing pipeline.

The following section explains in more detail the possibilities of basic data processing. Some of the processing steps should be integrated close to the pixel to avoid unnecessary data transfers outside the chip. Ideally, the data returned by each pixel will consist of the absolute minimum required to be transferred: the integral value (total number of optical photons detected during a given time interval), alternatively or additionally, the number of X-ray photons, and finally, a data stream consisting of packets containing the pixel id and the detected energy complementing the integral data with spectral information of each detected hit. Alternatively to such a provision of energy data for each detected X-ray photon, energy-resolved histograms (X-ray count numbers of energy bins) may suffice in e.g. Spectral CT.

Typically, the output of an analog X-ray detector is connected to a shaper to optimize the signal-to-noise and to allow for peak detection to determine the deposited energy. Such a shaping filter can also be realized as a FIR (finite impulse response) or IIR (infinite duration impulse response filter) digital bandpass filter, acting on the data stream provided by the DDSiPM. The peak detection can be implemented in a straight forward manner as well as an active baseline restoration. Moreover, an extended shaping filter with conditional operation (algorithmic filter) can be used. The advanced operation mode can be designed similar to the gated counting and pile-up suppression modes which are known from analog signal processing of γ-pulses.

Other algorithms like a de-convolution filter which recovers the initial delta-pulse of X-ray absorption in the scintillator can be implemented in a similar way. However, the complexity of the algorithm is limited by the available area. 3D stacking of the sensor and the processing chip can help solving this problem.

Another simple way to correct for a pile-up could use a lookup table. As the properties of the scintillator are well known, and assuming the pile-up is not too high so two subsequent pulses do not fall into the same clock cycle, a rising edge detector can be used to determine the arrival of a new pulse and to start a timer. The timer will count the number of clock cycles until the next pulse arrives. Given the temporal separation of the two pulses is known, the lookup table could hold the pile-up correction factors to be used to get the approximation of the real energy deposition. Also, the same factor combined with the measured energy can be used to calculate the excess energy due to pile-up to be subtracted from the next pulse energy. The input for the energy computation is simply the sum of detected optical photons during the timer interval. The advantage of the lookup table approach is its simplicity and flexibility.

Finally, the aforementioned integral value can be easily (and simultaneously) determined by summing up the detected photons over an interval of few hundred microseconds. This value would be equivalent to the charge converted by the PIN photodiode used in the current CT systems. A high dynamic range of more than 20 bits can be achieved, however a correction for the non-linearity of the DSSiPM will likely need to be implemented.

In summary, a digital sampling Silicon Photomultiplier (DSSiPM) in conjunction with a fast scintillator has been described providing a detector operating in single-quantum counting mode. The disclosed detection system also allows for energy discrimination of the X-ray quanta. This is preferably accomplished by signal processing in the digital domain. The processing can be partly realized within the Silicon Photomultiplier and partly in a subsequent digital processor. Detection system and digital signal processing also allow for simultaneous readout in counting mode and integrating mode.

Each pixel of the DSSiPM is coupled to a scintillator element where the incident X-ray photons are converted to optical photons. Single optical photons are registered by the cells of a pixel. During an integration period $T_1$, registered optical photons are counted. The count numbers of all cells of a pixel within a given integration period are added and passed to the digital output. This procedure realizes temporal sampling of the light output of the scintillator. Using the time characteristics of the scintillator as additional input, further digital processing electronics can reconstruct the rate and energy of the incident X-ray photons.

The disclosed system offers an integrated solution for X-ray detection. Since standard components or standard processes can be employed, the ID describes also a cost-effective detector. A main field of application of the invention is Spectral X-ray Imaging, especially CT, where very high counting rates need to be measured. The method described herein could also be beneficial to any other application where some sort of counting detector may be necessary, e.g. non-destructive testing.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A radiation detector, comprising
    at least one scintillator element for converting each incident x-ray photon into a burst of optical photons;
    a digital silicon photomultiplier, including:
        at least one pixel, including:
            a plurality of detector cells that detect the optical photons and generate detection signals indicative thereof, wherein the detection signals include digital, and not analog, values;
            a concentrator that receives the detection signals and determines a total number of optical photons received from the scintillator element during at least two predetermined acquisition intervals within a duration of one burst of optical photons; and
            an input for a digital clock signal with a frequency that triggers an acquisition interval of the at least one cell, and, based on the digital clock signal, the at least one pixel samples at a rate of approximately 100 MHz.

2. The radiation detector according to claim 1, wherein the scintillator element comprises a material with a decay time for a generated burst of optical photons between 10 nanosecond and eighty 80 nanoseconds.

3. The radiation detector according to claim 1, wherein the digital clock signal frequency is approximately 200 MHz.

4. The radiation detector according to claim 3, wherein the radiation detector comprises two groups of pixels that execute an acquisition interval during different logical levels of the digital clock signal.

5. The radiation detector according to claim 1, wherein the detector comprises an evaluation unit for evaluating the numbers determined by the pixels with respect to:
    the detection of a single converted photon;
    a correction for the piling up of optical photons generated by different converted photons;
    the integral number of optical photons detected during a given time interval; and/or
    the energy of single converted photons.

6. The radiation detector according to claim 5, wherein the evaluation unit comprises a timer for determining the temporal distance between two subsequent x-ray photons and a correction module for separating their measured effects based on said temporal distance.

7. The radiation detector according to claim 1, wherein the detector cells change from a sensitive to an insensitive state upon detection of a single optical photon.

8. The radiation detector according to claim 7, wherein the detector cells are reset to the sensitive state during reset intervals between two acquisition intervals.

9. The radiation detector according to claim 1, wherein the detector cells comprise an avalanche photodiode.

10. The radiation detector according to claim 1, wherein the concentrator adds the detection signals provided by the detector cell during an acquisition interval.

11. The detector of claim 10, wherein at least one concentrator includes a plurality of latches and full adder circuits.

12. The detector of claim 11, wherein concentrator outputs a digital value indicative of a sum of the detection signals of the at least one pixel.

13. An imaging system, comprising a radiation detector according to claim 1.

14. The detector of claim 1, wherein the concentrator runs at full clock speed.

15. The detector of claim 1, wherein the one burst is analyzed to detect pulses corresponding to at least one of X-ray hits or to detect and correct pile-up at high X-ray flux rates.

16. A method for detecting photons, comprising:
    converting x-ray photons incident on a scintillator element into a burst of optical photons;
    sampling, at a rate of 100 MHz, the burst of optical photons with a plurality of detector cells of a pixel of a digital silicon photomultiplier and outputting detection signals indicative thereof, wherein the detection signals include digital, and not analog, values;
    summing the detection signals with at least one concentrator, producing a digital value indicative of the sum of the detection signals; and
    determining numbers of optical photons received from the scintillator element during at least two predetermined acquisition intervals within a duration of one burst of optical photons.

17. The method according to claim 16, wherein the determined numbers of optical photons are evaluated with respect to the number and/or the energy of the converted x-ray photons.

* * * * *